US008926433B2

(12) United States Patent
Christensen

(10) Patent No.: US 8,926,433 B2
(45) Date of Patent: Jan. 6, 2015

(54) GROUP PLAY BONUS GAME WITH INITIAL BONUS OFFER

(75) Inventor: Erik Christensen, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1499 days.

(21) Appl. No.: 12/111,622

(22) Filed: Apr. 29, 2008

(65) Prior Publication Data

US 2009/0270173 A1 Oct. 29, 2009

(51) Int. Cl.
*A63F 13/12* (2006.01)
*G07F 17/32* (2006.01)

(52) U.S. Cl.
CPC .................................... *G07F 17/32* (2013.01)
USPC .......................................................... 463/42

(58) Field of Classification Search
CPC . G07F 17/32; G07F 17/3204; G07F 17/3209; G07F 17/3211; G07F 17/3225; G07F 17/323; G07F 17/3239; G07F 17/3244; G07F 17/3258; G07F 17/3262; G07F 17/3272; G07F 17/3281
USPC .......................................................... 463/42
See application file for complete search history.

(56) References Cited

U.S. PATENT DOCUMENTS

| | | | | |
|---|---|---|---|---|
| 6,652,378 | B2 | 11/2003 | Cannon et al. | |
| 6,890,257 | B2 | 5/2005 | Barlocher | |
| 6,942,567 | B2 | 9/2005 | Barlocher | |
| 7,192,349 | B2 | 3/2007 | Barlocher | |
| 7,326,114 | B2 | 2/2008 | Webb et al. | |
| 7,731,582 | B2 | 6/2010 | Randall et al. | |
| 7,785,195 | B2 | 8/2010 | Palmer | |
| 7,980,954 | B2 | 7/2011 | Gagner et al. | |
| 8,070,587 | B2 | 12/2011 | Davis et al. | |
| 2003/0040360 | A1 | 2/2003 | Kaminkow | |
| 2007/0054732 | A1 | 3/2007 | Baerlocher | |
| 2007/0105619 | A1 | 5/2007 | Kniesteadt | |
| 2008/0032763 | A1 | 2/2008 | Giobbi | |
| 2008/0045341 | A1 | 2/2008 | Englman | |
| 2008/0064492 | A1 | 3/2008 | Oosthoek | |
| 2008/0102916 | A1 | 5/2008 | Kovacs | |
| 2008/0108423 | A1 * | 5/2008 | Benbrahim et al. | 463/25 |
| 2009/0111560 | A1 | 4/2009 | Davis et al. | |
| 2009/0131175 | A1 | 5/2009 | Kelly et al. | |
| 2010/0004058 | A1 | 1/2010 | Acres | |
| 2010/0130276 | A1 * | 5/2010 | Fiden et al. | 463/16 |
| 2010/0323784 | A1 | 12/2010 | Acres | |
| 2011/0034240 | A1 | 2/2011 | Naicker et al. | |
| 2011/0230251 | A1 | 9/2011 | Nicely et al. | |

* cited by examiner

*Primary Examiner* — Damon Pierce
*Assistant Examiner* — Jeffrey Wong
(74) *Attorney, Agent, or Firm* — Marvin Hein

(57) ABSTRACT

A method, system, and gaming machine for enabling a group play bonus feature is described. The method comprises networking a plurality of gaming machines, wherein each gaming machine includes a primary game module and a bonus game module. The method then proceeds to determine which of the plurality of gaming machines are qualified for playing the group bonus game. A first qualified gaming machine is selected and a bonus offer is presented to the qualified gaming machine. The bonus offer includes an initial bonus offer that is user selectable, and an alternative random bonus prize that is awarded if the user instruction indicates that the initial bonus offer has not been accepted. After the user selectable instruction is received, a bonus prize is awarded.

20 Claims, 4 Drawing Sheets

GROUP PLAY BONUS GAME WITH INITIAL BONUS OFFER

FIELD OF THE INVENTION

The invention relates to a group play bonus feature for networked gaming machines that affects the bonus game for a group of qualified networked gaming machines, in which the selected player may decide to accept or reject an initial bonus.

BACKGROUND

Gaming machines such as slot machines include a primary game and a bonus game. The game is begun when a coin, credit, coupon, cash or other financial instrument is input into the gaming machine. A player is then given an opportunity to place a wager, and the wager selection process can be relatively complicated depending on the type of game. For example, the player has to select the amount to wager, the number of paylines to play, and possibly even evaluate a paytable. The player then proceeds to "pull" the slot handle by pushing a button that initiates game play for the primary game.

During primary game play on a slot machine, for example, the reels spin and a player waits approximately six seconds for the outcome of the game session. During these six seconds, the underlying game accesses a random number generator (RNG) that generates a random output. The random output is then used to determine whether a player wins an award.

There are a variety of different awards that a player may win such as credits, a progressive, or the ability to play a bonus game. The player is awarded a prize based on the pay table and the resulting random number. With respect to a progressive jackpot, a portion of the players' wagers are placed in a "pot" and each player that is wagering on a gaming machine linked to the progressive jackpot has an opportunity to be awarded the progressive prize.

Another prize may also be awarded for a "bonus" game. The bonus game is a game-within-a-game, which may be triggered by a primary game prize. As such, a winning game outcome in the bonus game may result in awarding a bonus prize that is added to the prize won in the underlying primary game. Alternatively, a winning game outcome in the bonus game may result in multiplying the prize in the underlying primary game. A more detailed discussion of a bonus game feature is provided in commonly assigned U.S. Pat. No. 7,351,144 entitled BONUS GAME USING A SUBSET OF REELS that is hereby incorporated by reference.

Although a variety of different bonus features exists, previous implementation of bonus features in gaming machines have not permitted players to select or control the bonus results.

SUMMARY

A method for enabling a group play bonus feature is described. The method comprises networking a plurality of gaming machines, wherein each gaming machine including a primary game module and a bonus game module. The method then proceeds to determine which of the plurality of gaming machines are qualified for playing the group bonus game. A first qualified gaming machine is selected and a bonus offer is presented to the qualified gaming machine. The bonus offer includes an initial bonus offer that is user selectable, and an alternative random bonus prize that is awarded if the user instruction indicates that the initial bonus offer has not been accepted. After the user selectable instruction is received, a bonus prize is awarded. If the user selectable instruction for the first qualified gaming machine corresponds to awarding the random bonus prize, the initial bonus offer is communicated to another qualified gaming machine. In the illustrative embodiment, the initial bonus offer is increased if the initial bonus offer is rejected, and the increased initial bonus offer is communicated to another qualified gaming machine.

Additionally, a gaming machine having a group play bonus feature is described. The gaming machine comprises a primary game module, a bonus game module, a bonus status indicator, user controls and a network device. The primary game module and bonus game module corresponding to the gaming machine is described. The bonus game module comprises a bonus offer that includes an initial bonus offer that is user selectable, and an alternative random bonus prize that is awarded if the user instruction indicates that the initial bonus offer has not been accepted. A bonus status indicator configured to indicate the bonus offer corresponding to the gaming machine is described. The user controls receives a user instruction related to the bonus offer. A network device receives the bonus offer, and if the user selectable instruction for the gaming machine corresponds to awarding the random bonus prize, the initial bonus offer is communicated to another qualified gaming machine.

Furthermore, a gaming system having a group play bonus feature is described. The gaming system comprises a plurality of gaming machines, a primary game, a bonus game and a bonus game controller. Each of the plurality of gaming machines has a bonus status indicator, user controls, a networking device, and is configured to play a primary game. The primary game and the bonus game correspond to each of the plurality of gaming machines. The bonus game controller associated with the bonus game is described, wherein the bonus game controller is operatively coupled to each of the plurality of gaming machines. The bonus game controller qualifies gaming machines and selects a gaming machine that receives a bonus offer that includes an initial bonus offer that is user selectable, and an alternative random bonus prize that is awarded if the user instruction indicates that the initial bonus offer has not been accepted. After the user selectable instruction is received, a bonus prize is awarded. If the user selectable instruction for the first qualified gaming machine corresponds to awarding the random bonus prize, the initial bonus offer is communicated to another qualified gaming machine. In the illustrative embodiment, the initial bonus offer is increased if the initial bonus offer is rejected, and the increased initial bonus offer is communicated to another qualified gaming machine.

DRAWINGS

The present embodiments will be more fully understood by reference to the following drawings which are for illustrative, not limiting, purposes.

DETAILED DESCRIPTION

Figure 1:
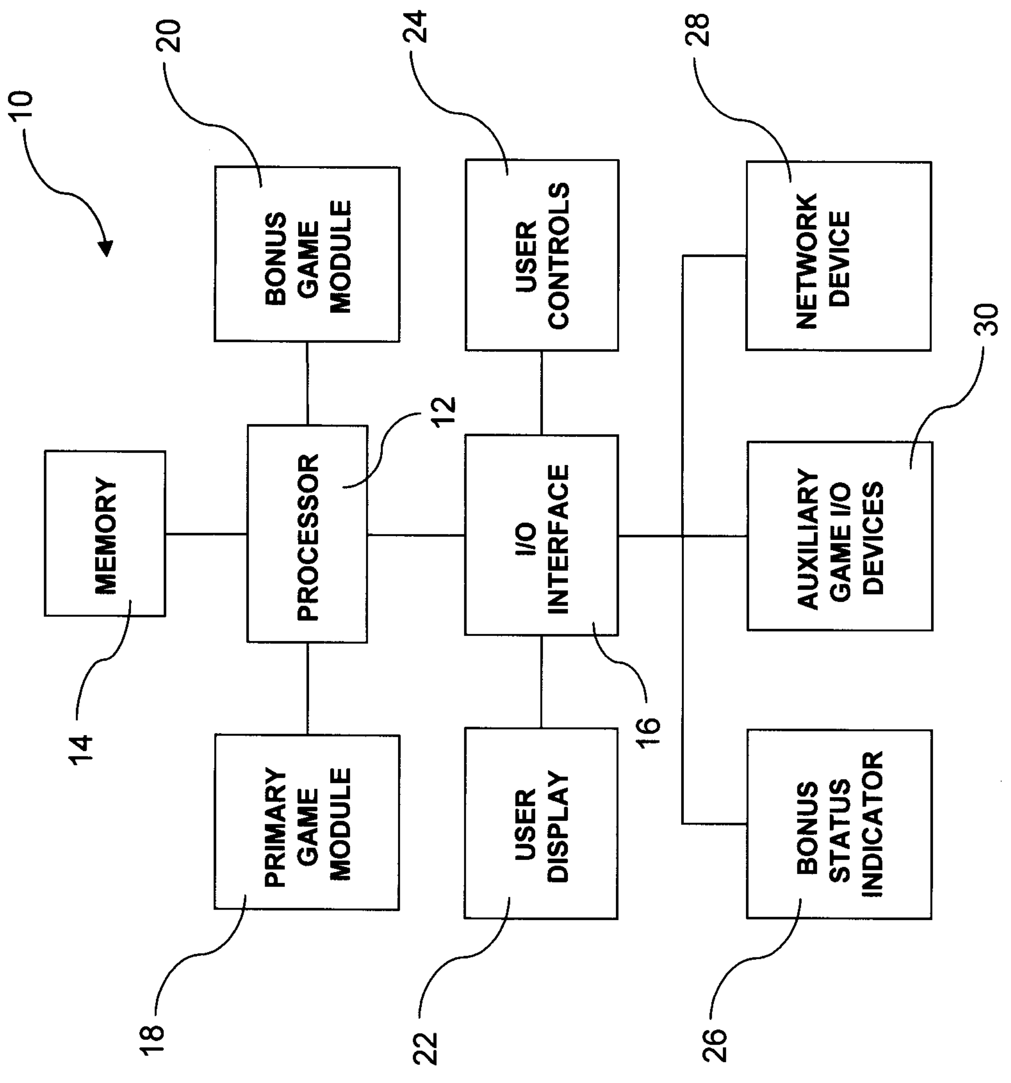
FIG. 1 shows a gaming device having a group play bonus feature.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the wireless multimode devices described hereinafter may vary as to configuration and as to details. Additionally, the methods may vary as to details, order of the actions, or other variations without departing from the illustrative method disclosed herein.

The gaming device, systems and methods described herein provides a group bonus feature, in which one player's decision regarding a bonus can affect the bonus game for other players that are playing the same primary game. The group play bonus feature described herein operates as a secondary game in a bank or group of gaming machines such as electronic gaming machines (EGMs) wherein individual or primary games such as slot machine or video poker are being played. An EGM may be used to refer to a slot machine, bingo machine, video poker machine, video keno machine, video lottery machine, or like device useful for playing a game. In describing the operation or features an EGM, reference may be made interchangeably to a gaming machine, gaming device, EGM itself or to a player or user of the EGM.

In operation, the systems, methods and gaming machine include a triggering event that results in a bonus offer such as an initial bonus offer being sent to the player of a selected EGM in the illustrative EGM bank or "slot" bank. Note, that the terms "Slot Bank", "game bank" and "EGM bank", which may be used interchangeably, mean a group of EGMs that may participate in a group play game. Generally, the EGMs of an EGM bank are adjacent to one another or within a geographic area. In some instances, such as a particular casino property there may be a distributed group of slot banks or EGM banks that may be related to one other based on operating the same primary game. By way of example and not of limitation, the EGMs within an EGM bank may be networked within a local area network (LAN).

The "triggering event" or "trigger event" qualifies gaming machines so that qualified machines receive the bonus offer corresponding to the group play bonus feature. The trigger event may comprise, for example, passage of a fixed time period, passage of a random time period, a wager amount threshold on a single EGM, a cumulative wager amount in an EGM bank, a wager frequency threshold on a single EGM or in an EGM bank, an "Nth coin-in" for a single EGM or an EGM bank, or other such criteria. Qualification requirements for group play eligibility, and which individual EGMs are qualified, may be displayed on the individual EGMs or by separate communal display. Players observing that their EGMs are not eligible for bonus game play may thus seek to increase wager frequency or wager amount during primary game play in order to be eligible for bonus game play when a triggering event occurs.

In the illustrative example, the bonus offer is a fixed bonus prize or amount of specified value which may be accepted, or which may be rejected in favor of a random bonus prize that is also referred to as a "mystery" bonus prize of unknown, but potentially greater value. In the illustrative embodiment described below, the bonus offer includes a user selectable initial bonus offer and an alternative random bonus prize that is awarded if the user instruction indicates that the initial bonus offer has not been accepted If the initial bonus offer is accepted, the fixed bonus prize is awarded to the player of the selected EGM. Upon acceptance, the fixed bonus prize may also be awarded to players of other EGMs in the EGM bank. If the initial bonus offer is rejected, the player of the selected EGM is awarded the mystery bonus prize, which may vary randomly, e.g. from two times the line bet amount to ten times the line bet amount.

Upon rejection of the initial bonus offer by the selected EGM player, the initial bonus offer is increased by an incremental amount and the resulting bonus offer is passed on or offered to another qualified EGM in the EGM bank; the player at the other qualified EGM may then accept or reject the increased initial bonus offer or opt for a separate mystery bonus prize. If the second EGM player rejects the increased initial bonus offer, the initial bonus offer may be repeatedly passed on or offered to yet another EGM player, until the initial bonus offer is accepted. In the illustrative embodiment, the initial bonus offer may be incrementally increased each time it is rejected and passed on by a player. Players that have passed on the initial bonus offer and opted for the mystery bonus prize are ineligible for further bonus prize offers during the remainder of the game.

By way of example and not of limitation, each time an initial bonus offer is triggered or passed on, the EGMs within the EGM bank may be notified via an EGM display or by separate communal display, that the bonus offer has been accepted or passed on and, if passed on, that the bonus offer has been increased. Players within the EGM bank may watch the displayed occurrence of bonus offers and encourage each other to accept the safer fixed bonus prize or to reject the fixed bonus prize and accept the more risky mystery bonus prize.

The group play bonus feature described herein provides each player in an EGM bank to choose to "play safe" and select a known prize, or to forego or reject the initial bonus offer or incremented bonus offer and go for a more risky mystery bonus prize that may be substantially greater. Audio and video cues may be used to create anticipation as to when a bonus prize offer will occur. For example, when the initial bonus offering is passed on by multiple players and is incrementally increased as it is passed on, this activity may result in increased play and improved community play.

With the above in mind, reference is now made to FIG. 1, wherein is shown an electronic gaming machine (EGM). EGM 10 in many embodiments is a conventional gaming device that includes the components and features typically found in a personal computer. EGM 10 thus includes a processing element 12 that is operatively coupled to a memory element 14, and an input/output (I/O) interface element 16. EGM 10 also includes a primary game module 18 and a secondary or bonus game module 20.

Memory 14 and processor 12 are capable of storing and executing primary game module 18 and bonus game module 20. Processor 12 may be any conventional logic processing device, such as a central processing unit, digital signal processor or application-specific integrated circuit (IC). Memory 14 generally includes random access memory (RAM) and read only memory (ROM) components.

Primary game module 18 includes computer programming configured for carrying out operations associated with primary games, such as slot machine, poker, "black jack", keno, video lottery, mahjong, or like popular games. Bonus game module 20 includes computer programming configured for carrying out operations associated with the group play bonus game feature described herein. Bonus game operations include, for example, monitoring eligibility or qualification of EGM 10 for group bonus play, enrollment of EGM 10 in a group bonus play game if the EGM 10 is eligible, displaying whether or not EGM 10 is eligible for group bonus play and what steps, if any, are needed to achieve eligibility, monitoring and displaying occurrence of triggering events, offering bonus prizes to EGM 10, monitoring acceptance or rejection of bonus prizes by EGM 10, and displaying acceptance or rejection of bonus prizes by other EGMs within an EGM bank.

Input/output interface 16 is operatively coupled to a user display 22, user controls 24, a bonus status indicator 26, a network device 28, and auxiliary game I/O devices 30. I/O interface 16 allows communication between processor 12 and the various I/O devices 22, 24, 26, 28, 30 and thus allows a player using EGM 10 to interact with and play primary and bonus games 18, 20 by providing input control signals and receiving output control signals associated with operation of games 18, 20.

User display 22 may comprise a video display such as a cathode ray tube (CRT), a liquid crystal display (LCD) panel, or like display device capable of providing visual output to a user or player of EGM 10. User controls 24 may comprise input buttons, switches, levers, keypad, touch-pad, touch screen controls, or other devices that allow a user to input signals regarding game play features, wager amount, wager execution, acceptance or rejection of a bonus prize, or other signals from the user.

The bonus status indicator 26 comprises a display element, which may be integral to or separate from display 22, for providing output to a user regarding the status of the bonus game. Bonus status indicator 26 generally includes a visual component or components configured to display, for example, eligibility or qualification criteria for a group bonus game, whether or not the EGM 10 being played is currently qualified for group bonus play, the identity of other EGMs 10 within an EGM bank that are qualified for group bonus play, occurrence of a triggering event, identity of an EGM 10 offered a bonus prize, and acceptance or rejection of a bonus prize offer by the selected EGM 10.

Network device 28 comprises a communication device such as a network card or serial device for communicating with other network devices (e.g., back-end servers) via a network which is operatively coupled to the network device 28. Network device 28 allows EGM 10 to be interfaced to a gaming network with a bonus game controller (described further below) and other EGMs for operation of the group play bonus game. Network device 28 also allows interface of EGM 10 with other gaming and casino servers for carrying out security, authorization, authentication, and other gaming and casino operations.

Auxiliary game I/O devices 30 may also be included with EGM 10, such as speakers, lights, alarms, buzzers, LED display, MIDI or MP3 player devices capable of playing fanfare music or other sounds, and the like. I/O devices 30 may be integral to or associated with bonus status indicator 26 and used to indicate events related to group bonus play, such as occurrence of triggering events, and offers and acceptance of bonus prizes by EGM 10 or other EGMs within an EGM bank. I/O devices 30 may also indicate events associated with primary game play.

Figure 2:
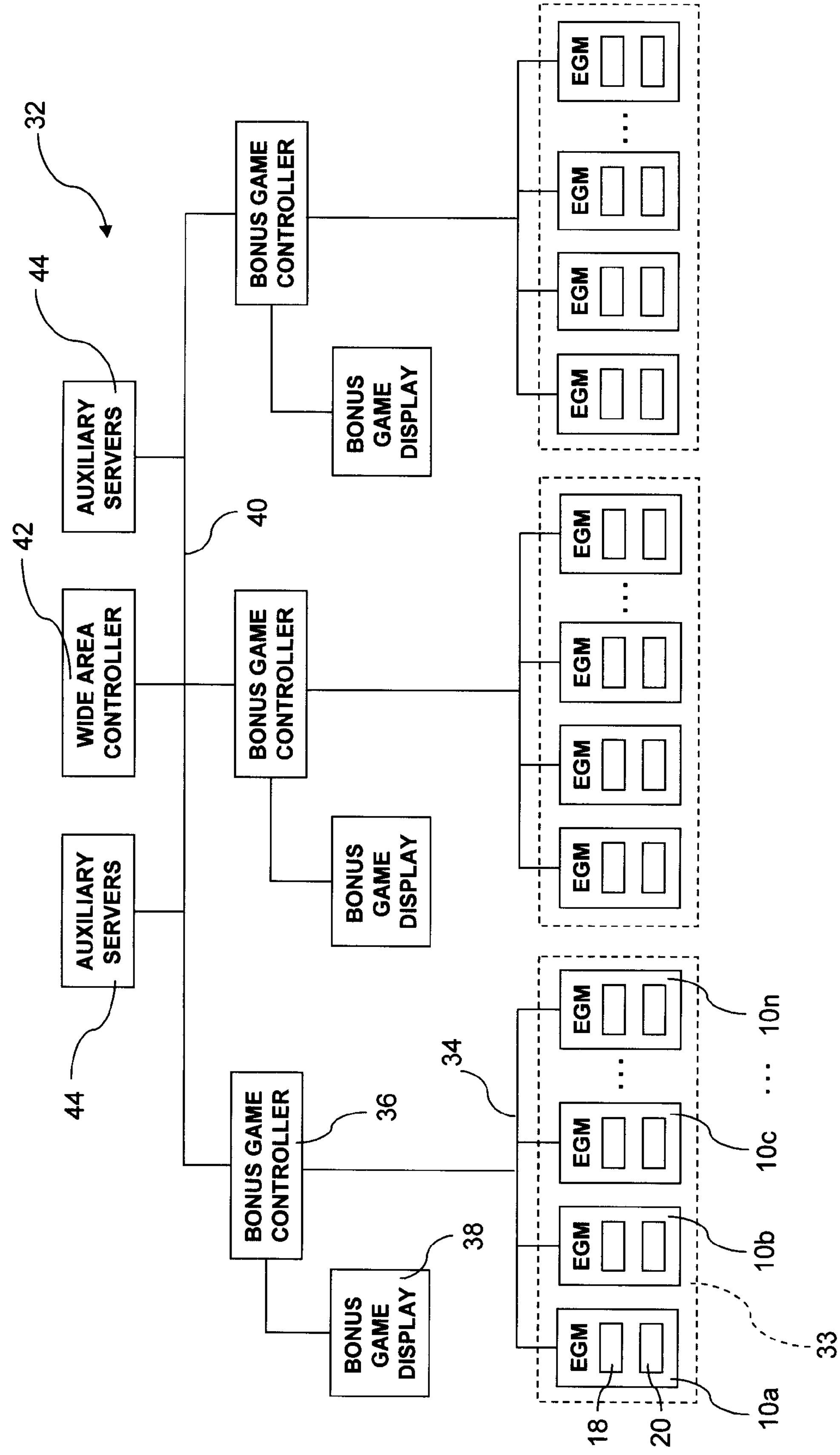
FIG. 2 shows a networked gaming system having a group play bonus feature.

Referring now to FIG. 2, there is shown a networked gaming system 32 for carrying out group bonus play feature described herein. System 32 includes at least one EGM bank 33 having a plurality of EGMs 10*a*, 10*b*, and 10*c* through 10*n*. In the embodiment of FIG. 2, three EGM banks are shown. The number of EGM banks may vary depending upon the size of gaming operations and particular embodiments. The EGMs 10*a*, 10*b*, 10*c* . . . 10*n* of EGM bank 33 are operatively coupled through a local area network 34 to a bonus game server or controller 36. Each bonus game controller is operatively coupled to a group bonus game display such as display 38. Each bonus game controller may also be operatively coupled to a wide area controller 42 via wide area network 40. Auxiliary gaming or casino servers 44 may also be operatively coupled to wide area network 40.

EGM bank 33 comprises EGMs 10*a*, 10*b*, and 10*c* through 10*n* that may be located at a particular casino property or across different properties. In the illustrative embodiment, EGMs 10*a*, 10*b*, and 10*c* through 10*n* are in close enough proximity to allow player interaction between the players of the EGMs. In other embodiments the EGMs 10*a*, 10*b*, and 10*c* through 10*n* in an EGM bank 33 may all be configured to play a particular type of primary game, so that a particular group bonus game is associated with EGMs playing the same game, such as video poker. The arrangement of EGMs 10*a*, 10*b*, and 10*c* through 10*n* within an EGM bank 33 may be based on other criteria that would readily suggest themselves to a slot manager of a slot floor.

Illustrative bonus game controller 36 includes a processor, memory, interfaces and user I/O devices (not shown) found in conventional networking devices. By way of example and not of limitation, bonus game controller 36 thus is capable of storing and executing computer programming associated with group bonus play, and receiving input from players of EGMs 10*a*, 10*b*, and 10*c* through 10*n* during bonus game play according to user input at controls 24 described in FIG. 1. Bonus game controller 36 monitors primary game activities, such as wager amounts and frequency of wager, by the EGMs 10*a*, 10*b*, and 10*c* through 10*n* within EGM bank 33, that may be relevant to events in a bonus game. Program operations carried out by bonus game controller 36 include, for example, determining the start of a group bonus game, determining occurrence of triggering events for bonus prize offers, determining eligibility of the EGMs in an EGM bank for group bonus play, enrollment of eligible EGMs in a group bonus play game when a triggering event occurs, selecting an EGM for offer of a bonus prize, determining fixed bonus prize amounts, monitoring acceptance or rejection of a bonus prize and whether or not acceptance or rejection of prize occurs within a predetermined time period, determining random bonus prize amounts, and determining the end of a group bonus game.

The determination of occurrence of triggering events, EGM eligibility, and bonus prize amounts by bonus game controller 36 will, in many embodiments, be determined by wagering activity by individual EGMs and/or by EGM banks as monitored by bonus game controller 36. Thus, programming operations provided by bonus game controller 36 may also include monitoring cumulative wager amounts over a period of time for individual EGMs and/or an EGM bank, monitoring frequency of wagering over a period of time for individual EGMs and/or an EGM bank, and monitoring occurrence of maximum wager events by individual EGMs and/or within an EGM bank.

Bonus game controller 36 also includes programming for communicating aspects of the group play bonus game to the players of EGMs within an EGM bank. Such communication may be made via the bonus game status indicator 26 and/or user display 22 on individual EGMs, by group bonus game display 38, or by both. Bonus game controller 36 accordingly includes programming capable of communicating, to individual EGMs and/or an EGM bank, the start of a group bonus game, eligibility of individual EGMs for bonus game play, occurrence of triggering events, offer of bonus prizes, acceptance or rejection of bonus prizes, expiration of bonus prize offers, and the end of group bonus games. When communicating the offer of a bonus prize, the identity of the individual EGM to which the offer is made may be displayed to all EGMs within the EGM bank.

Bonus game display 38 includes one or more visual display elements, and may have one or more additional audio display elements, configured for display of events and information associated with group bonus play. Bonus game display 38 is configured to display communally to the EGMs within bank 33 (upon instruction from bonus game controller 36), the start of group bonus game, triggering events, the offer of bonus prizes, acceptance or rejection of bonus prizes, and the end of a group bonus game. As noted above, the identity of individual EGMs participating in group bonus play, and the identity of an individual EGM that is offered a bonus prize, may also be displayed. By way of example, bonus game display 38 is located overhead or is otherwise positioned so that it is visible to all EGMs within an EGM bank.

Wide area controller 42 may include all of the elements and programming of bonus game controller 36, and be configured to manage extended group bonus play by EGMs across multiple EGM banks 33. Wide area controller 42 thus is capable of carrying out the program operations described above for individual bonus game controller 36. Extended group bonus play may proceed as a third level or "tertiary" game level game that occurs together with primary games occurring at individual EGMs and with "secondary" group bonus play games occurring within individual EGM bank 33 according to control by individual bonus game controller 36. Extended group bonus play in some embodiments may be a casino-wide bonus play game, and may occur less frequently according to more stringent triggering criteria, and be subject to more stringent EGM qualification criteria, but involve offer larger bonus prize amounts than occur during regular group bonus play.

Wide area network 40 may be operatively coupled to additional or auxiliary servers 44. Auxiliary servers 44 may comprise, for example, gaming and casino servers for carrying out security, authorization, authentication, game management and slot management system (SMS) operations, game data system operations, casino management, and other gaming and casino functions. Auxiliary servers 44 provide for communication with and management of individual EGMs 10*a*, 10*b*, and 10*c* through 10*n* during casino operation.

The illustrative SMS uses conventional authentication, authorization and verification protocols, which may be implemented and/or controlled by a S2S (server to server) server that enables secure communication of data between the respective servers within the system. A slot management system supports a wide range of promotional tools to enable various promotional and marketing programs, which may be used in conjunction with casino market place server ("CMP") or another system gaming subsystem. Additionally, it shall be appreciated that the illustrative system described herein may be implemented with software downloads using the download and configuration server system and slot management system described in commonly assigned patent publication 2008/0064501 entitled DOWNLOAD AND CONFIGURATION CAPABLE CGAMING MACHINE OPERATING SYSTEM, GAMING MACHINE AND METHOD, which is hereby incorporated by reference.

Figure 3:
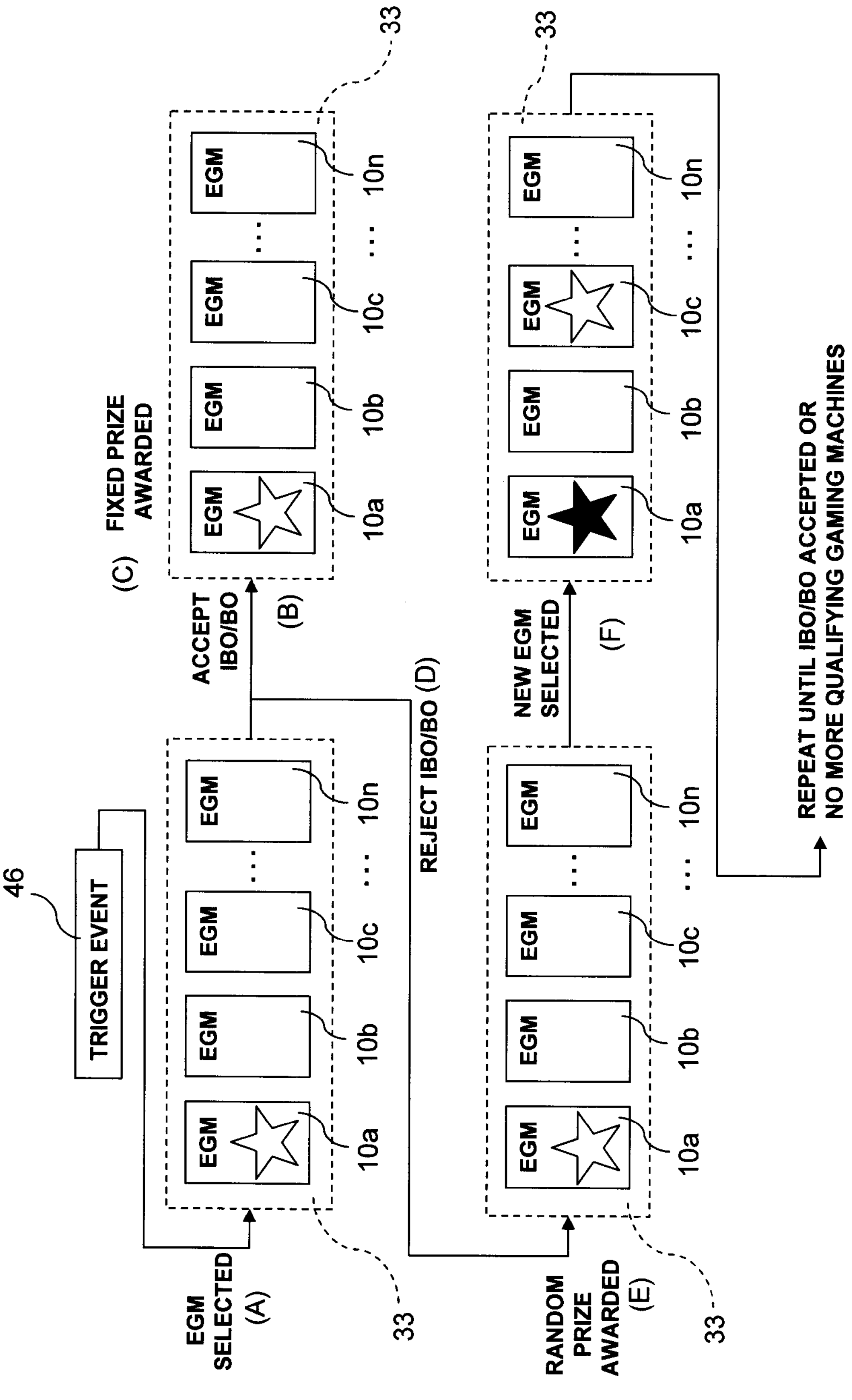
FIG. 3 shows a sequential diagram illustrating the group play bonus feature.

Referring now to FIG. 3, the operation of one embodiment of the subject group play bonus game is shown in simplified form. In FIG. 3, a triggering event 46 occurs and results in (A) EGM selection within EGM bank 33 of a qualified EGM 10*a* from a group or bank of qualified EGMS 10*a*, 10*b*, and 10*c* through 10*n*. The selected EGM 10*a*, identified with a "star", is presented a bonus offer that includes an initial bonus offer that is user selectable.

If the selected EGM 10*a* (B) accepts the initial bonus offer (IBO), in which case (C) a fixed bonus prize is awarded to the selected EGM 10*a* and a fixed bonus prize is awarded to the remaining qualified EGMs. Subsequently, the bonus game ends and a new game session may be initiated.

Alternatively, selected EGM 10*a* may reject the initial bonus offer (D) and be awarded a random bonus prize offer (E). The random prize may vary. Following the award of the random bonus prize to EGM 10*a*, a new qualified EGM is selected (F). As shown in FIG. 3, the newly selected EGM 10*c* is identified with a "star". Previously selected EGM 10*a* is no longer qualified for bonus play in this bonus game, as indicated by a darkened "star".

In the illustrative embodiment, the initial bonus offer is increased and this increased bonus is communicated to EGM 10*c*. EGM 10*c* may then proceed to accept the increased bonus offer (B) as indicated above and be awarded the fixed bonus prize (C); or reject the increased bonus offer (D) and be awarded the random bonus prize (E) as described above. If EGM 10*c* elects the random bonus prize, event (B) is repeated amongst the remaining qualified EGMs, until the bonus offer is accepted, or until a bonus offer has been made to each qualified EGM.

Figure 4:
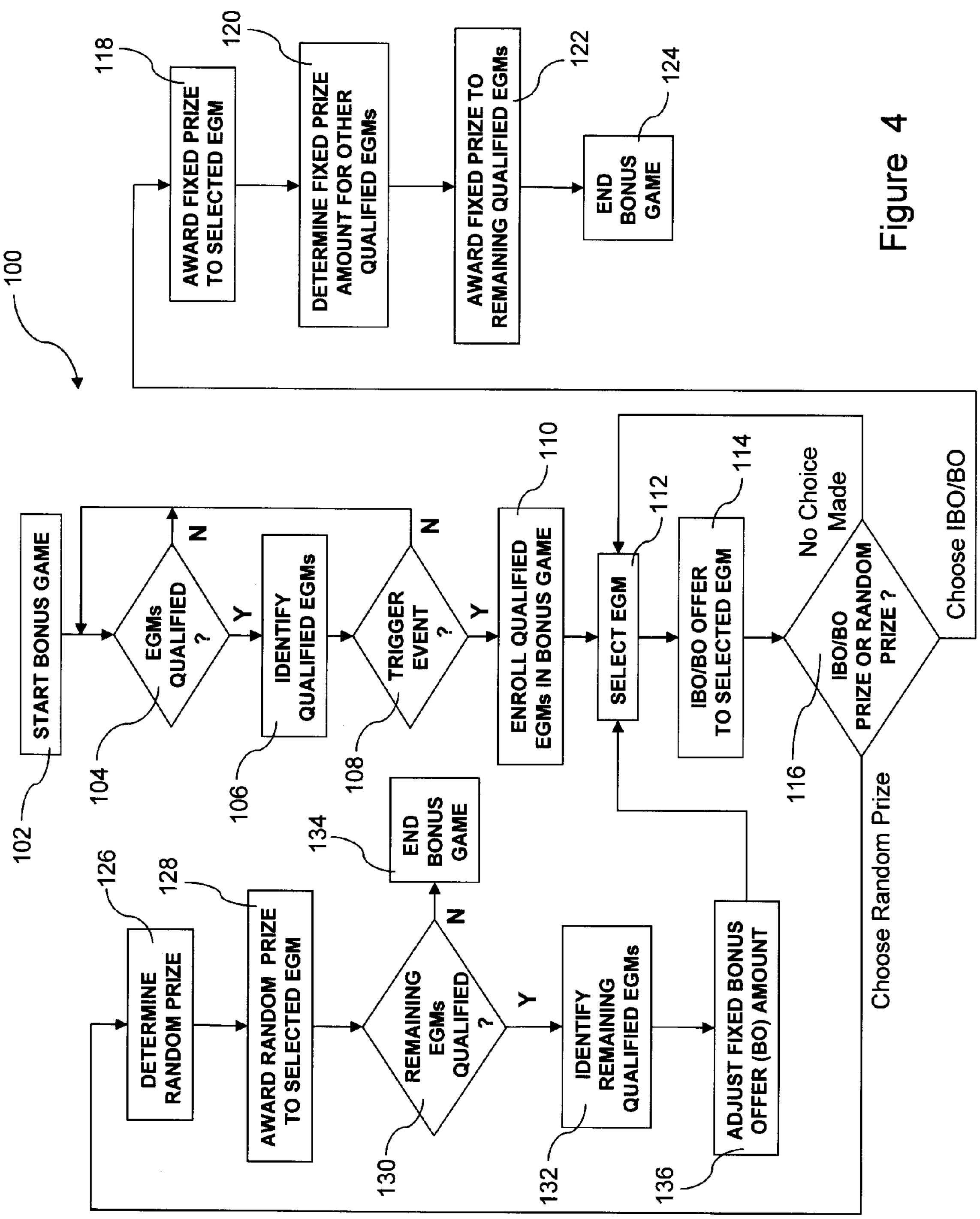
FIG. 4 shows a flowchart of a gaming method for enabling a group play bonus feature.

The method for enabling the group play bonus feature may be more fully understood by reference to the flow chart of FIG. 4 as well as FIG. 1 and FIG. 2 as described above. At event 102, the bonus game is initiated and will generally occur while primary game play is under way by the players at EGMs within the illustrative EGM bank 33. Determination of game start may be made by bonus game controller 36, and may occur after passage of a predetermined time period. The initiation of the group play bonus feature may occur, for example, on an hourly basis or at greater or longer time intervals, or at random times, or may start according to other criteria, such as the presence of a minimum threshold number of players at EGMs 10*a*, 10*b*, and 10*c* through 10*n* within an EGM bank 33. In certain embodiments the start of game 102 may be determined by other casino servers 44 according to a property's activity. Notice of the start of the bonus game is displayed to EGM players in event 102 via bonus game display 38 and/or by display at individual EGMs via bonus status indicator 26 or user display 22, according to instruction from bonus game controller 36. Display of bonus game start may be accompanied by audio cues such as bells, alarms, fanfare music and the like, as well as visual clues such as flashing signage.

At event 104 a determination is made by bonus game controller 36 as to which EGMs 10*a*, 10*b*, and 10*c* through 10*n* within EGM bank 33 are eligible or qualified for group bonus play. As noted above, various selection or qualification criteria may be used for determining eligibility, including cumulative wager amount or wager frequency for the individual EGMs, passage of time since last bonus offer, or other criteria. If qualified EMGs are found, event 106 is carried out. If no qualified EGMs are found, event 104 is repeated.

In event 106, qualified EGMs are identified by bonus display controller 36. Display of EGM eligibility may also occur during event 106. In certain embodiments, the eligibility of individual EGMs within the EGM bank may be displayed in event 106 to the entire EGM bank via bonus game display 38, while in other embodiments bonus game eligibility may be displayed only to individual EGMs via bonus status indicator 26. After notice of the start of game 102, players observing display 38 and/or indicator 26 in event 106 are advised as to whether or not their EGMs are eligible for bonus game play. Ineligible players may then be motivated to increase wager frequency or wager amount during primary game play in order to be eligible for bonus game play when a triggering event occurs. Players that are eligible for bonus game play will carry on primary game play to maintain eligibility, as reduced primary game play may result in loss of eligibility prior to occurrence of a trigger event.

At event 108, a determination is made by bonus game controller 36 as to whether or not a bonus offer triggering event has occurred. As noted above, various triggering criteria may be used to determine when an initial bonus offer is made, such as the passage of a fixed period of time, passage of a random period of time, exceeding a threshold cumulative wager amount within an EGM bank, exceeding a threshold cumulative number of wager events within an EGM bank, or other criteria. In certain embodiments triggering events may be determined by other casino servers 44 according to property specific activities, e.g. slot tournaments. If a trigger event occurs, event 110 is carried out. If no trigger event occurs, EGM qualification determination in event 104 is repeated.

At event 110, EGMs within the EGM bank that were qualified at occurrence of the triggering event 108 are enrolled, by bonus game controller 36, in the bonus game for bonus prize selection.

At event 112, one of the eligible EGMs enrolled in event 110 is selected by bonus game controller 36 for offer of an initial bonus prize. In many embodiments selection of an eligible EGM for bonus prize offer is done randomly. In certain embodiments selection of an eligible EGM for an initial bonus prize may be based on other selection criteria. For example, the initial bonus prize offer may be made to the EGM having the largest cumulative wager amount or greatest number of wager events over a set period of time.

At event 114, a first or initial bonus offer (IBO) is offered to the EGM selected in event 112. The initial bonus offer may be made by bonus game controller 36 as a fixed bonus prize of specified value which may be directly accepted or which may be rejected in favor of a "mystery" bonus prize of unknown, but potentially greater or lesser value. The player of the selected EGM thus must choose between the safe fixed bonus prize and the riskier, but potentially greater, mystery or random bonus prize. The amount of the fixed bonus prize may be set at an arbitrary or fixed credit amount. The fixed bonus prize amount may be periodically adjusted according to wager activity within the EGM bank. In other embodiments the fixed bonus prize amount may be based on a multiple of the highest wager made at the selected EGM by the current player, or may be a percentage of the wagers handled for the EGM bank or the qualified and enrolled EG MS, or determined by other criteria.

Occurrence of the initial bonus offer is also displayed during event 114. In many embodiments notice of the initial bonus offer is displayed to all eligible EGMs enrolled in the current bonus game. This display may be made communally via bonus game display 38, by display at individual EGMs via bonus status indicator 26, or both, according to instruction from bonus game controller 36. Notice of the initial bonus offer in many embodiments will generally include identification of the EGM to which the initial bonus offer has been made. Players at enrolled EGMs, upon viewing the notification of the initial bonus offer, may encourage the player of the identified EGM to choose the fixed bonus prize or to go for the mystery or random bonus prize. In certain embodiments display of notice of the initial bonus offer and the EGM selected for initial bonus offer may also be made to non-eligible EGMs to encourage players to alter primary game play activity in order to qualify for future bonus games. Display of notice of the initial bonus offer may be accompanied by audio cues such as bells, alarms, fanfare music and the like, as well as visual clues such as flashing signage, as noted above.

In certain embodiments the occurrence of a triggering event 108 and the selection of an EGM for bonus offer at event 112 may be separately displayed prior to the occurrence of an initial bonus offer in event 114. The display of the triggering event and EGM selection event may be briefly separated in time from each other and from display of occurrence of the initial bonus offer. In this manner anticipation of receipt of a bonus prize offer by players of the eligible EGMs is increased and can enhance the group play experience for players of the qualified, enrolled EGMs.

At event 116, a determination is made by the player of the selected EGM as to whether or not the initial bonus offer will be accepted, or if the initial bonus offer will be rejected and the mystery or random bonus prize accepted instead. If the initial bonus offer is accepted, event 118 occurs. If the initial bonus offer is rejected, and the player of the selected EGM chooses the mystery bonus prize instead, event 120 occurs. The player at the selected EGM makes the selection determined in event 116 by using the controls 24 of the selected EGM.

Following acceptance of the initial bonus offer, the fixed bonus prize is awarded in event 118 to the EGM selected in event 112. Notice of acceptance of the initial bonus offer by the selected EGM is communicated by bonus game controller 36 to bonus game display 38 and/or bonus status indicator 26 for display to players of the EGMs enrolled in the bonus game.

After awarding of the fixed bonus prize in event 118, the fixed bonus prize is also awarded in event 122 to the remaining qualified EGMs in the bonus game. In many embodiments the fixed bonus prize awarded in event 122 is the same amount as that awarded in event 118. Where the fixed bonus prize is incrementally adjusted at block 120, the adjustment may optionally be carried out in certain embodiments prior to event 122, such that the remaining eligible EGMs participating in the bonus game receive a smaller or greater fixed bonus prize than provided in event 118 to the EGM selected in event 112. Notification of the award of the fixed bonus prize to the remaining qualified EGMs is displayed to the players by bonus game display 38, by display at individual EGMs via bonus status indicator 26, or both. After awarding the fixed bonus prize to the remaining eligible players in event 122, the bonus game ends at event 124.

Returning now to decision diamond 116, if the player of the selected EGM rejects the initial bonus offer and instead chooses the "mystery" or random prize in event 116, a "mystery" or random prize is awarded in event 126 by bonus game controller 36 to the selected EGM. The amount of the random bonus prize is determined by the bonus game controller 36 in event 126, and the random bonus prize may range in value from zero value to a higher multiple of the fixed bonus prize amount. Determination of the random prize amount may be based on wagering activity of the selected EGM, the EGMs enrolled in the current game, or all EGMs within the EGM bank. The random bonus prize is awarded at block 128. Notice of acceptance of the random bonus prize (and rejection of the fixed bonus prize) by the selected EGM is communicated by bonus game controller 36 to bonus game display 38 and/or bonus status indicator 26 for display to players of the EGMs enrolled in the bonus game.

At event 130, bonus game controller 36 determines whether or not any qualified EGMs remain in the bonus game. If yes, event 132 occurs. If not, the bonus game ends at event 134. This determination is made by reviewing the list of qualified EGMs that were enrolled in the bonus game at event 100. The end of the bonus game 134 would occur, for example, if only one qualified EGM was enrolled in the game at event 100. The EGM previously selected in event 112 for offer of the bonus prize is no longer qualified at event 130. The remaining qualified EGMs thus include all qualified EGMs identified in event 106 except for the EGM selected in event 112.

At event 132, any remaining qualified EGMs are identified by bonus display controller 36. Display of remaining EGM eligibility may be made via bonus game display 38 and/or bonus status indicator 26. After notice of the start of game 102, players observing display 38 and/or indicator 26 in event 106 are advised as to whether or not their EGMs are eligible for bonus game play. Ineligible players may then be motivated to increase wager frequency or wager amount during primary game play in order to be eligible for bonus game play when a triggering event occurs. Players that are eligible for bonus game play will carry on primary game play to maintain eligibility, as reduced primary game play may result in loss of eligibility prior to occurrence of a trigger event.

After identification of the remaining qualified EGMs in event 132, event 112 is repeated, and one of the remaining qualified EGMs is selected for another bonus offer (BO), after which the events described above subsequent to 112 are repeated. The initial bonus offer rejected in event 116 by the selected EGM is thus "passed on" to another qualified EGM for another round of bonus game play. The next selected EGM, in repeated event 112, may then accept the bonus offer or opt for the random bonus prize following the events described above, and the game continues until acceptance of the bonus offer, or until a bonus offer has been made to each qualified EGM enrolled in the game. Players at EGMs that have previously been selected and awarded bonus prizes are not eligible for selection and bonus prize offers in later rounds or iterations of the bonus game.

Prior to selection of another qualified EGM in event 112, event 136 may optionally occur wherein the amount of the fixed bonus prize may be incrementally adjusted upward to provide an increase in the initial bonus offer or subsequent bonus offers. In such embodiments players of qualified EGMs enrolled in the game may encourage the player of the selected EGM to accept the mystery or random bonus prize, in the anticipation of being offered a greater fixed bonus prize in the next round of the bonus game. The amount (if any) of incremental adjustment may be determined according to wager activity within the EGM bank or by other criteria. For example, the amount of the initial bonus offer may be added to each subsequent bonus offer. In certain embodiments, the initial bonus offer may be doubled upon each subsequent offer. In embodiments of the bonus game where the bonus offer is incrementally adjusted each time it is passed on, a bonusing crescendo can occur in the game as the bonus offer is passed on and increased each time that it is passed on. Many variations of the group play bonus game shown in FIG. 4 are possible. For example, after event 132, event 106 may be carried out instead of event 112 (as described above); in such embodiments the selection of another qualified EGM and passing of the bonus does not occur until another triggering event occurs. In another variation of the game, determination of qualified EGMs may occur after the triggering event; in such embodiments players of the EGMs 10*a*, 10*b*, and 10*c* through 10*n* will not be certain of qualification of a bonus offer until after the triggering event.

In certain embodiments, multiple levels of bonus game play may occur where individual group bonus game play is carried out within individual EGM banks 33 according to instruction and control by corresponding individual bonus game controllers 36, and broader group bonus game play occurs simultaneously across multiple EGM banks 33 under instruction and control of wide area controller 42. The wide area group bonus play across multiple EGM banks may occur simultaneously with bonus game play within individual EGM banks. The triggering and qualification criteria for the wider area bonus game play may be more stringent, and the size of the bonus prize offerings may be greater for wide area bonus game play.

Other variations of the group bonus game feature are possible and will suggest themselves to those skilled in the art. Accordingly, it will be understood that the detailed description of illustrative embodiments are provided for illustrative purposes. The scope of the claims is not limited to these specific embodiments or examples. The gaming device, systems and methods described herein provides a group bonus feature, in which one player's decision regarding a bonus can affect the bonus game for other players that are playing the same primary game. Various structural limitations, elements, details, and uses can differ from those just described, or be expanded on or implemented using technologies not yet commercially viable, and yet still be within the inventive concepts of the present disclosure. The scope of the claims is determined by the following claims and their legal equivalents.

What is claimed is:

1. A method for enabling a group play bonus feature, the method comprising:

networking a plurality of gaming machines, in which each gaming machine includes a primary game module and a bonus game module;

determining which of the plurality of gaming machines are qualified for playing the group play bonus feature;

selecting a first qualified gaming machine;

presenting a bonus offer to a first qualified gaming machine, the bonus offer including an initial bonus offer subject to a user selectable instruction, and an alternative random bonus prize that is awarded if the user selectable instruction indicates that the initial bonus offer has not been accepted;

awarding the alternative random bonus prize when the user selectable instruction from the first qualified gaming machine indicates that the initial bonus offer has not been accepted;

presenting the initial bonus offer to a second gaming machine after the initial bonus offer was rejected by the first qualified gaming machine, wherein the initial bonus offer is subject to a user selectable instruction on the second gaming machine;

presenting a second alternative random bonus prize to the second gaming machine; and awarding the second alternative random bonus prize when the user selectable instruction on the second gaming machine indicates that the initial bonus offer has, again, not been accepted.

2. The method of claim 1 wherein the bonus offer is increased and presented to the second gaming machine if the user selectable instruction from the first qualified gaming machine indicates that the initial bonus offer has not been accepted.

3. The method of claim 2, wherein the bonus offer is incrementally increased each time the bonus offer is rejected.

4. The method of claim 1, further comprising awarding the bonus offer to each gaming machine if the user selectable instruction indicates that the initial bonus offer has been accepted.

5. The method of claim 1, further comprising determining whether a triggering event has occurred and selecting one or more gaming machines based upon the occurrence of the triggering event.

6. The method of claim 5, wherein the triggering event occurs during a primary gaming activity of the plurality of gaming machines.

7. The method of claim 6, further comprising qualifying a gaming machine to play in the group play bonus feature according to wagering in the primary gaming activity of each of the plurality of gaming machines.

8. A gaming machine having a group play bonus feature, the gaming machine comprising:

a primary game module configured to operate on the gaming machine;

a bonus game module configured to operate on the gaming machine, the bonus game module comprising a bonus offer comprising an initial bonus offer subject to a user selectable instruction, and first alternative random bonus prize that is awarded if the user selectable instruction indicates that the initial bonus offer has not been accepted;

a bonus status indicator configured to indicate the bonus offer corresponding to the gaming machine;

user controls configured to receive a user selectable instruction related to the initial bonus offer;

a network device which receives the initial bonus offer when the user selectable instruction for the gaming machine indicates that the initial bonus offer has not been accepted, the network device configured to present the initial bonus offer to a second gaming machine;

a second alternative random bonus prize presented to the second gaming machine; and wherein the initial bonus offer is subject to a user selectable instruction on the second gaming machine and the second alternative random bonus prize is awarded if the user selectable instruction on the second gaming machine indicates that the initial bonus offer has not been accepted.

9. The gaming machine of claim 8 wherein the bonus offer is increased and-presented to the second gaming machine if the user selectable instruction indicates that the initial bonus offer has not been accepted.

10. The gaming machine of claim 9, wherein the bonus offer is incrementally increased each time the bonus offer is rejected.

11. The gaming machine of claim 8, wherein the network device communicates that the initial bonus offer is to be awarded to the gaming machine if the user selection instruction indicates that the initial bonus offer has been accepted.

12. The gaming machine of claim 8, wherein the bonus game module further comprises a triggering event that qualifies the gaming machine to receive the bonus offer.

13. The gaming machine of claim 12, wherein the occurrence of the triggering event occurs during a primary gaming activity of the gaming machine.

14. A gaming system having a group play bonus feature, the gaming system comprising:

a plurality of gaming machines, each gaming machine comprising:
 a bonus status indicator;
 a plurality of user controls;
 a networking device;
 a primary game;
 a bonus game;

a bonus game controller associated with the bonus game, wherein the bonus game controller is operatively coupled to each of the plurality of gaming machines, the bonus game controller configured to qualify gaming machines and select a gaming machine that receives a bonus offer, the bonus offer comprising an initial bonus offer subject to a user selectable instruction, and an alternative random bonus prize that is awarded if the user selectable instruction indicates that the initial bonus offer has not been accepted; and a bonus prize that is awarded after the user selectable instruction is received, wherein if the user selectable instruction for a first gaming machine indicates that the initial bonus offer has not been accepted, the initial bonus offer is presented to a second gaming machine wherein the initial bonus offer is subject to a user selectable instruction on the second gaming machine and a second alternative random bonus prize is awarded if the user selectable instruction on the second gaming machine indicates that the initial bonus offer has not been accepted.

15. The gaming system of claim 14 wherein the bonus offer is increased and presented to the second gaming machine if the user selectable instruction indicates that the initial bonus offer has not been accepted.

16. The gaming system of claim 15, wherein the bonus offer is incrementally increased each time the bonus offer is rejected.

17. The gaming system of claim 14, further comprising awarding the bonus offer to each gaming machine if the user selectable instruction indicates that the initial bonus offer has been accepted.

18. The gaming system of claim 14,further comprising determining whether a triggering event has occurred and selecting one or more gaming machines based upon the occurrence of the triggering event.

19. The gaming system of claim 18, wherein the triggering event occurs during a primary gaming activity of the plurality of gaming machines.

20. The gaming system of claim 19, further comprising qualifying a gaming machine to play in the group bonus feature according to wagering in the primary gaming activity of each of the gaming machines.

* * * * *